United States Patent [19]

Prukop

[11] Patent Number: 5,095,989

[45] Date of Patent: Mar. 17, 1992

[54] MICROEMULSION METHOD FOR IMPROVING THE INJECTIVITY OF A WELL

[75] Inventor: Gabriel Prukop, Houston, Tex.

[73] Assignee: Texaco Inc., White Plains, N.Y.

[21] Appl. No.: 658,492

[22] Filed: Feb. 21, 1991

[51] Int. Cl.$^5$ .............................................. E21B 43/22
[52] U.S. Cl. ............................... 166/305.1; 166/273; 166/275; 252/8.554
[58] Field of Search ............. 166/273, 274, 275, 305.1, 166/312; 252/8.554

[56] References Cited

U.S. PATENT DOCUMENTS

| | | | |
|---|---|---|---|
| 3,648,774 | 3/1972 | Kirk | 166/273 X |
| 3,670,819 | 6/1972 | Dauben et al. | 166/273 X |
| 3,885,628 | 5/1975 | Reed et al. | 166/274 X |
| 3,920,073 | 11/1975 | Holm | 166/275 X |
| 3,981,361 | 9/1976 | Healy | 166/274 X |
| 4,414,119 | 11/1983 | Duke, Jr. | 166/275 X |
| 4,534,411 | 8/1985 | Morita et al. | 166/274 |
| 4,690,217 | 9/1987 | Taggart et al. | 166/274 |
| 4,882,075 | 11/1989 | Jones | 252/8.554 X |

*Primary Examiner*—George A. Suchfield
*Attorney, Agent, or Firm*—Jack H. Park; Kenneth R. Priem; Harold J. Delhommer

[57] ABSTRACT

A method for improving the injectivity of an injection well for water or gas injection into an underground hydrocarbon formation which comprises injecting into the formation through an injection well a sufficient amount of a solvent-in-water microemulsion comprising about 0.5% to about 5% by weight of an alkoxylated linear alcohol having about 10 to about 16 carbon atoms in the linear alcohol moiety and an average of about 5 to about 12 alkoxylate groups, about 0.5% to about 5% by weight of an alkylbenzene sulfonate having an alkyl chain of about 8 to about 20 carbon atoms, about 1% to about 10% by weight of an ethylene glycol alkylether solvent, and water.

7 Claims, 1 Drawing Sheet

MICROEMULSION METHOD FOR IMPROVING THE INJECTIVITY OF A WELL

BACKGROUND OF THE INVENTION

The invention relates to a method for improving the injectivity of a well for water or gas injection into an underground hydrocarbon formation. More particularly, the invention method injects a microemulsion of surfactant and solvent into the near wellbore area to lower residual oil saturation.

Residual saturation of oil in the near wellbore area of an injection well can severely limit the injectivity of water and other fluids with limited oil solubility. This permeability limit is the result of the oil in the pore spaces controlling any mobile fluid in the interstitial pores. One may also view the residual oil as droplets trapped in the larger areas of the pore. When these droplets start to flow because of a pressure differential, they plug the outlet of the pore space much like the ball in a check valve. These restrictions on flow greatly increase the cost of water injection in secondary recovery and also limit the rate at which oil can be produced from some reservoirs. Tertiary recovery schemes are also limited by oil or oil products in the near wellbore area.

The industry has attempted to solve injectivity problems with the injection of surfactant slugs. U.S. Pat. No. 4,886,120 discloses the use of a surfactant slug to improve the water injectivity of a well, wherein the surfactant has the formula:

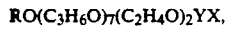

$RO(C_3H_6O)_n(C_2H_4O)_2YX$, wherein R is a mixture of alkyl groups containing from 12 to 15 carbon atoms, Y is a sulfate group, and X is a monovalent cation. U.S. Pat. No. 4,690,217 discloses the use of a similar propoxylated, ethoxylated surfactant to increase water injectivity into a formation.

U.S. Pat. Nos. 4,216,098; 4,293,428; 4,406,798; 4,738,789 and numerous others disclose the use of alkoxylated surfactants for tertiary oil recovery by injection in surfactant slugs.

A field test of surfactant injection to decrease oil saturation around a well and increase injectivity is discussed in Dymond, P. F. et al., "Magnus Field: Surfactant Stimulation of Water-Injection Wells," SPE Reservoir Engineering, Feb. 1988, pp 165-174. The systems disclosed as tested in the laboratory or in the field consisted of polyalkylene sulfonate mixed with alkylphenol alkoxy alcohol and $C_4$ and $C_5$ aliphatic alcohols for the cold test at 20° C., and alkyl aromatic alkoxysulfate and $C_5$ aliphatic alcohol for the hot case of 105° C., slightly lower than reservoir temperature.

SPE Paper 12599, Martin, F. D., "Injectivity Improvement in the Grayburg Formation at a Waterflood in Lea County, NM," presented at the 1984 Permian Basin Oil and Gas Recovery Conference in Midland, Texas, Mar. 8-9, 1984, discusses two field tests of a surfactant solution alone, and an aromatic solvent followed by a surfactant solution to increase water injectivity in a New Mexico well. The injected surfactant was a phosphate ester in each test and the solvent was aromatic naphtha.

SUMMARY OF THE INVENTION

The invention is a method for improving the injectivity of an injection well for water or gas injection into an underground hydrocarbon formation which comprises injecting into the formation through an injection well a sufficient amount of a solvent-in-water microemulsion to treat the formation within a radial distance of about 5 to about 100 feet from the injection well. The solvent-in-water microemulsion comprises about 0.5% to about 5% by weight of an alkoxylated linear alcohol having about 10 to about 16 carbon atoms in the linear alcohol moiety and an average of about 5 to about 12 alkoxylate groups, about 0.5% to about 5% by weight of an alkylbenzene sulfonate having an alkyl chain of about 8 to about 20 carbon atoms, about 1% to about 10% by weight of an ethylene glycol alkylether solvent, and water.

DETAILED DESCRIPTION

Figure 1:
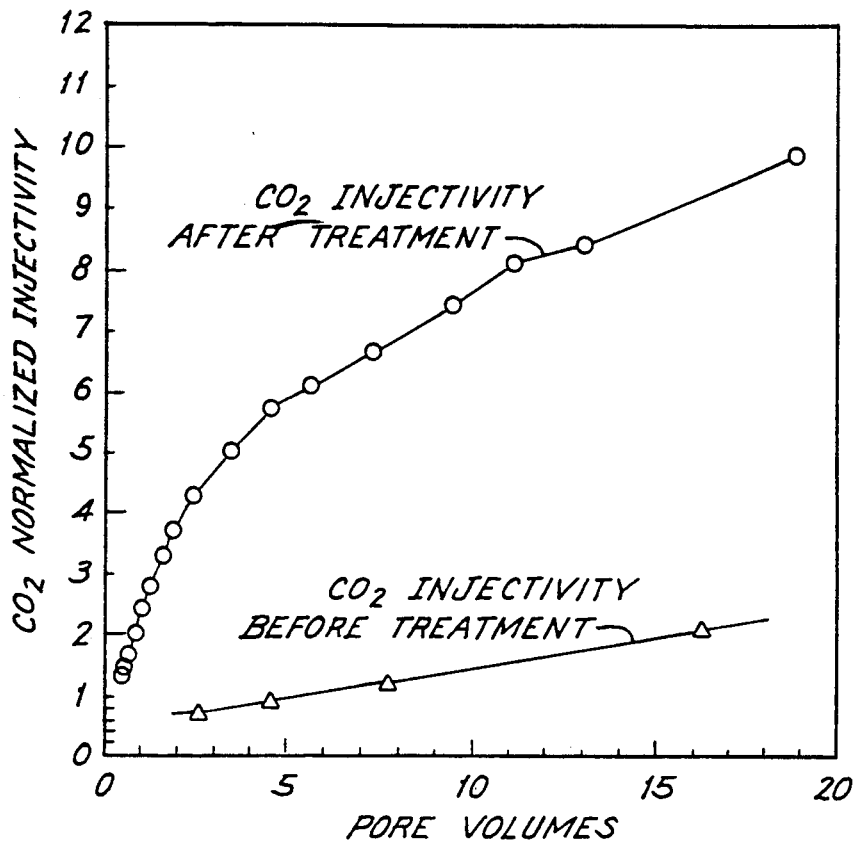
FIG. 1 graphs the normalized injectivity of carbon dioxide versus pore volumes of injected fluid for the Example 2 treatment.

A chemical system for increasing the injectivity of a well which comprises a microemulsion of surfactant and an ethylene glycol alkylether can remove the residual oil saturation away from the immediate wellbore area. The improvement in injectivity is a function of the radius around the wellbore which is cleaned. Although surfactants alone can be formulated to remove much of the residual oil inhibiting injectivity, the use of a microemulsion containing a solvent and surfactant assists the process by immediately solubilizing the oil on contact. A microemulsion system has the advantage of solvent treatment without the cost, since the solvent is only a fraction of the overall microemulsion. Thus, such microemulsion systems are more efficient than surfactant only systems.

The invention method for improving the injectivity of an injection well for water or gas injection into an underground hydrocarbon formation comprises injecting into the formation through an injection well a sufficient amount of a solvent-in-water microemulsion to treat the formation within a radial distance of about 5 to about 100 feet from the injection well. The solvent-in-water microemulsion comprises about 0.5% to about 5% by weight of alkoxylated linear alcohol having about 10 to about 16 carbon atoms in the linear alcohol moiety and about 5 to about 12 alkoxylate groups, about 0.5% to about 5% by weight of an alkylbenzene sulfonate having an alkyl chain of about 8 to about 20 carbon atoms, about 1% to about 10% by weight of an ethylene glycol alkylether solvent, and water.

The alkoxylated linear alcohol may have different alkylene oxide groups, such as ethylene oxide, propylene oxide or butylene oxide. Preferably, the compound will be either ethoxylated and propoxylated, or ethoxylated with about 5 to about 12 alkoxylate groups, most preferably about 6 to about 8 ethoxylate groups. The linear alcohol moiety will preferably have about 12 to about 14 carbon atoms. The alkoxylated linear alcohol should be chosen to have a cloud point close to, but below the reservoir temperature to take advantage of the most efficient operating temperature for the surfactant.

The alkylbenzene sulfonate will preferably have an alkyl chain of about 10 to about 16 carbon atoms. The ethylene glycol alkylether will preferably be a butoxyethanol or propoxyethanol, most preferably 2-butoxyethanol.

It should be recognized that the relative amounts of components within the microemulsion may vary substantially and still remain within the scope of the invention method. However, for an effective decrease in injectivity, it is desirable that the components be present in proportions so as to create a relatively stable microemulsion. These concentrations will vary depending upon the salinity of the water used in the microemulsion, the temperature, and the particular surfactants and solvent employed. Preferably, the alkoxylated linear alcohol and alkylbenzene sulfonate will each be present in the microemulsion in about a 1% to about 3% by weight concentration. The ethylene glycol alkylether is preferably present in a range of about 3% to about 5% by weight.

Although it is generally desirable to inject sufficient microemulsion to treat a large radius around the injection well, the cost of the injectivity treatment and its efficacy must be balanced. The pore volume required increases substantially with increasing radius. The mass of required surfactant and solvent, and hence the cost, increases in proportion to the square of the radius of the flood. Furthermore, the return in improved injectivity diminishes as the improving permeability area moves progressively farther away from the wellbore. Thus, although the treatment may be realistically applied to a radial distance from the injection well of about 5 to about 100 feet, it is preferred to treat the near wellbore area for a distance of about 15 to about 50 feet.

The following examples will further illustrate the novel method of improving the injectivity of injection well by the present invention. These examples are given by way of illustration and not as limitations on the scope of the invention. Thus, it should be understood that the steps of the invention method may be varied to achieve similar results within the scope of the invention.

EXAMPLES

In Examples 1 and 2, the invention method was tested for its ability to improve fluid injectivity. In both examples, a microemulsion was prepared containing 2% by weight of a linear alcohol ethoxylate having an average of 12 to 14 carbon atoms in the linear alcohol moiety and about 7 moles of ethylene oxide, 2% by weight of an alkylbenzene sulfonate having an average alkyl chain length of about 10 to 16 carbon atoms sold under the trademark Witconate 703 by Witco Chemical Co., and 4% ethylene glycol monobutylether (2-butoxyethanol). The microemulsion was prepared in a synthetic Mabee field brine having a salinity of about 38,000 ppm TDS including a total divalent ion concentration of about 2000 ppm The microemulsion was employed in Example 1 at about 23° C. and in Example 2 at about 41° C. The cloud point temperature for the ethoxylated linear alcohol was about 43° C.

EXAMPLE 1

A Pyrex ® tube was filled with crushed and sieved limestone, and saturated with the synthetic Mabee field brine of 38,000 ppm TDS. The simulated core was then saturated with Mabee stock tank crude having an average API gravity of about 33° to 83% of the pore Volume. A subsequent waterflood with the synthetic brine reduced the oil saturation to 19%, the irreducible oil saturation to waterflooding with this core, oil and brine.

Brine injection of 0.5 ml/min. produced an injection pressure of 16 psi. A 0.125 pore volume of the microemulsion was injected with a loop injector. An oil bank formed immediately and swept through the packed tube. Oil saturation was reduced to near zero and the brine injection pressure dropped to 9 psi. This represents nearly a doubling of the injectivity to water.

EXAMPLE 2

A dolomite core from a Mabee field well was cleaned and encased in epoxy. The core was saturated with brine, and then the Mabee stock tank oil. Waterflooding was performed until irreducible oil saturation of about 25% was reached.

The pressure and flow rate at this stable condition of irreducible oil saturation was used as the basis for determining injectivity. Injectivity is defined as the flow rate divided by the pressure. The normalized injectivity is the instantaneous injectivity divided by the base injectivity.

The core was subjected to a carbon dioxide flood under about 2250 psi which yielded a multiple contact miscibility system. The normalized injectivity was plotted in FIG. 1 as the carbon dioxide injectivity before treatment.

Figure 2:
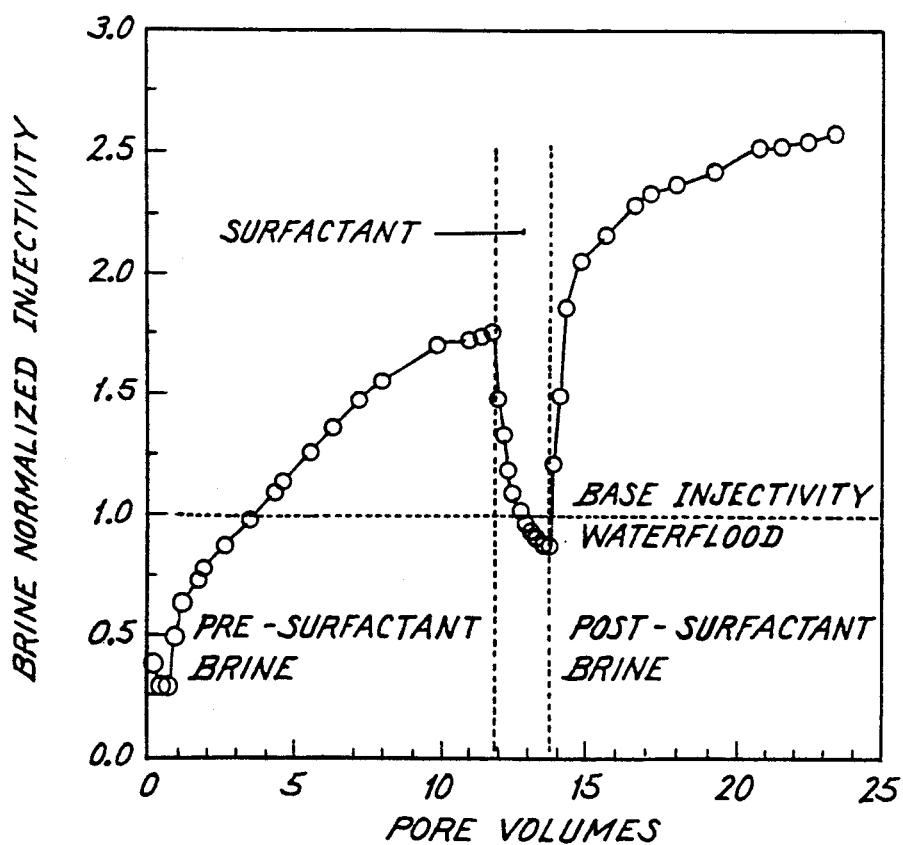
FIG. 2 graphs the normalized injectivity of brine versus pore volumes injected for the injectivity of water before and after the microemulsion slug in the Example 2 treatment.

Carbon dioxide was followed by a water injection containing a microemulsion slug in the middle of the water injection which was followed by carbon dioxide injection. The normalized injectivity for this water, microemulsion, water injection is shown in FIG. 2. The injectivity dropped while the surfactant was being injected because of the viscosity of the microemulsion and oil being banked by the chemical slug. The injectivity recovered and improved with subsequent water injectivity. The carbon dioxide slug that followed the microemulsion treatment showed a great improvement in injectivity. This is illustrated in FIG. 1 as the carbon dioxide injectivity after treatment.

As a result of these linear tests, a radial flood in the field is expected to show a significant increase in injectivity for water when water alternates with carbon dioxide. An even more substantial improvement is expected with carbon dioxide injections without alternating water slugs.

Many other variations and modifications may be made in the concepts described above by those skilled in the art without departing from the concept of the present invention. Accordingly, it should be clearly understood that the concepts disclosed in the description are illustrative only and are not intended as limitations on the scope of the invention.

What is claimed is:

1. A method for improving the injectivity of an injection well for water or gas injection into an underground hydrocarbon formation penetrated by said injection well which comprises:
   injecting into an underground hydrocarbon formation through an injection well a sufficient amount of a solvent-in-water microemulsion to treat the formation within a radial distance of about 5 to about 100 feet from the injection well,
   said solvent-in-water microemulsion comprising about 0.5% to about 5% by weight of an alkoxylated linear alcohol having about 10 to about 16 carbon atoms in the linear alcohol moiety and an average of about 5 to about 12 alkoxylate groups, about 0.5% to about 5% by weight of an alkylbenzene sulfonate having an alkyl chain of about 8 to about 20 carbon atoms, about 1% to about 10% by weight of an ethylene glycol alkylether solvent, and water.

2. The method of claim 1, wherein the alkoxylated linear alcohol is ethoxylated and propoxylated.

3. The method of claim 1, wherein the alkoxylated linear alcohol is ethoxylated.

4. The method of claim 3, wherein the ethoxylated linear alcohol has about 12 to about 14 carbon atoms in the linear alcohol moiety and about 6 to about 8 ethylene oxide groups.

5. The method of claim 1, wherein the alkylbenzene sulfonate has about 10 to about 16 carbon atoms in the alkyl chain.

6. The method of claim 1, wherein the solvent is 2-butoxyethanol.

7. A method for improving the injectivity of an injection well for water or gas injection into an underground hydrocarbon formation penetrated by said injection well which comprises:

injecting into an underground hydrocarbon formation through an injection well a sufficient amount of a solvent-in-water microemulsion to treat the formation within a radial distance of about 15 to about 50 feet from the injection well, said solvent-in-water microemulsion comprising about 1% to about 3% by weight of an ethoxylated linear alcohol having about 12 to about 14 carbon atoms in the linear alcohol moiety and an average of about 6 to about 8 ethoxylate groups, about 1% to about 3% by weight of an alkylbenzene sulfonate having about 10 to about 16 carbon atoms in the alkyl chain, about 3% to about 5% by weight of a butoxyethanol solvent, and water.

* * * * *